Oct. 12, 1926.
T. J. GUTT
1,602,430
SPRING SUSPENSION
Filed Oct. 5, 1925
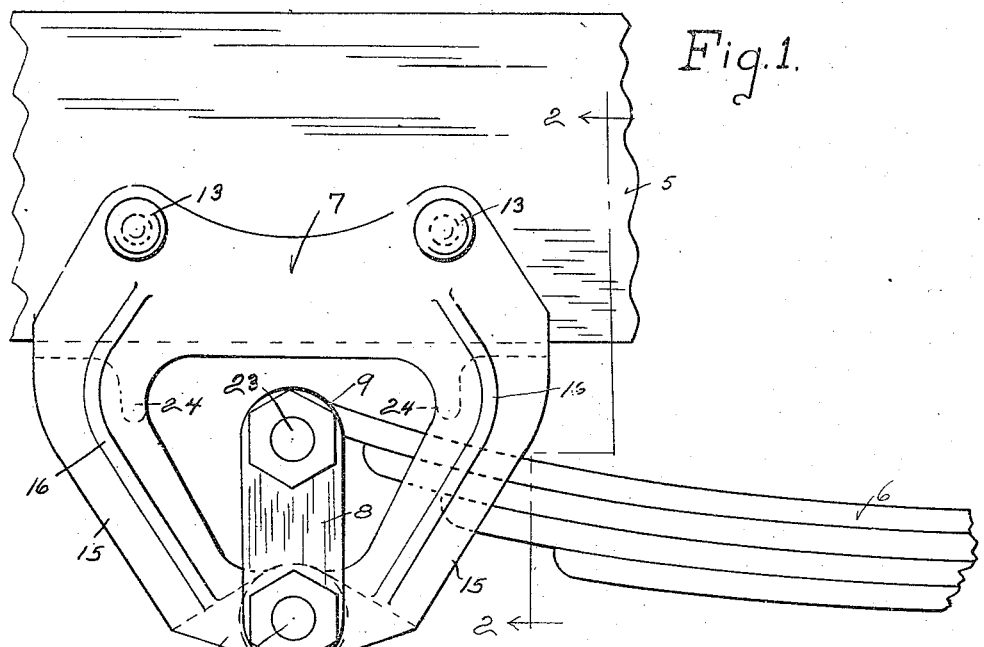
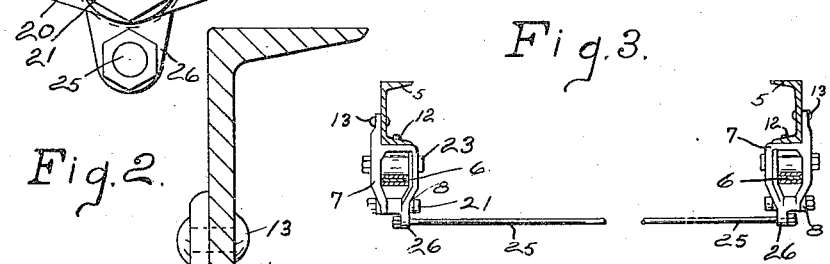
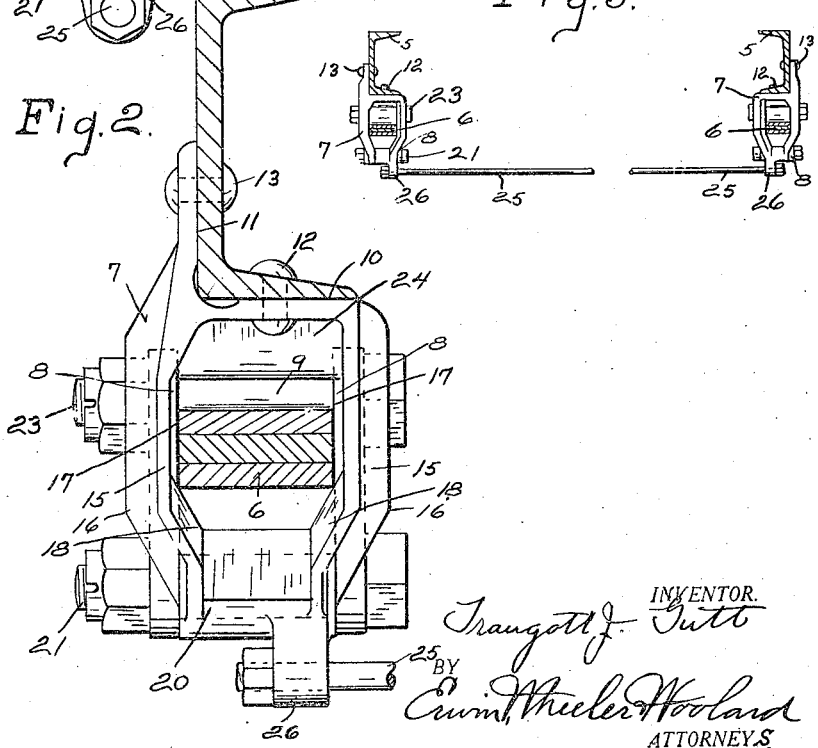
INVENTOR.
Traugott J. Gutt
BY
Erwin Wheeler Woolard
ATTORNEYS Patented Oct. 12, 1926.

1,602,430

UNITED STATES PATENT OFFICE.

TRAUGOTT J. GUTT, OF CLINTONVILLE, WISCONSIN.

SPRING SUSPENSION.

Application filed October 5, 1925. Serial No. 60,469.

This invention relates to improvements in spring suspension and more particularly to an improved hanger for connecting a vehicle spring and body.

It is the object of this invention to provide a novel and improved spring suspension which will rigidly connect the spring ends with the vehicle frame or body in a manner to eliminate side sway and to hold the springs in balance.

In the drawings:

Figure 1 is a side elevation of a fragment of a vehicle frame, a vehicle spring, and a hanger connecting the spring and frame in a manner embodying this invention.

Figure 2 is a section taken on line 2—2 of Figure 1, showing the hanger in end elevation and the spring and frame in section.

Figure 3 is a transverse section through an automobile frame, on a reduced scale, showing the application of a tie rod to connect brackets on the opposite sides of a frame.

Like parts are identified by the same reference characters throughout the several views.

The channel member 5 represents a portion of an automobile frame to which it is desired to connect the supporting spring 6. Preferably, all four springs of the vehicle are connected at each end to the frame by hangers corresponding to that disclosed at 7. In each instance the hanger is so designed as to be suspended by links 8 from the eye portions 9 of the main leaf of spring 6. This suspension of the frame at each end of every spring makes it possible for the springs to flex equally at both ends and makes it impossible for any unbalanced pressures to develop.

The hanger bracket 7 may conveniently comprise a box-like casting having a horizontal surface at 10 and an upright surface 11 which comprise a seat for the channel member 5 of the frame. Rivets 12 and 13 preferably connect the flange and web portions of the channel member 5 with adjacent portions of the hanger bracket 7, as clearly shown in Figure 2. An inspection of Figure 1 will disclose that in the present device two rivets 13 are used in spaced relation along frame member 5.

The hanger bracket comprises flanges at right angles which provide the surfaces 10 and 11 and from which depend four spaced arms 15, each of which is T-shaped in cross section, being formed with reenforcing ribs 16.

The pair of arms at the forward end of the hanger and the pair of arms at the rear end of the hanger converge toward each other, as clearly shown in Figure 1.

The intermediate portions of the arms of each pair are vertical and parallel to provide the laterally spaced surfaces 17 which are best shown in Figure 2. At their lower extremities 18 the arms on the inside and outside of the bracket converge and unite in a common bearing 20 for one of the hanger bolts 21.

The links 8, above referred to, are fulcrumed on bolt 21 and abut opposite ends of the bearing portion 20 of the hanger bracket. The portion 20 therefore may be termed a bearing element not alone because it supports the bearing bolt 21 but because its ends are in bearing contact with the links 8 to fix the positions of the links at such a spacing as to correspond approximately to the spacing between the surfaces 17. Each link operates in the plane of the bracket arms 15 upon its side of the bracket and in fact the inner surface of each link is preferably spaced slightly inwardly toward the center of the bracket from the plane which includes the surfaces 17 at the insides of arms 15. This spacing of the links 8 corresponds to the transverse length of the eye portion 9 of the main spring leaf and thus enables the links to abut the ends of the eye or bearing portion 9. A pivotal connection between the spring and links 8 is provided by the second hanger bolt 23. As above indicated, the arrangement is such that the weight of the frame member 5 is suspended by links 8 from the end of spring 6. The pivotal connection of the links with the spring and with the hanger bracket 7 is such as to ensure absolute freedom of pendular movement of the hanger bracket and frame with reference to each end of each spring as long as such movement is properly limited in extent. In the event of any tendency to undue movement between the parts, the pendular oscillation of links 8 will be limited to the arc subtended by the angle at which the arms 15 converge at the front and rear of the bracket.

Due to the suspension of hanger bolt 21 below hanger bolt 23, there is at times a considerable tendency for lateral movement between the frame and spring such as to produce side sway in the vehicle. This movement, however, is strictly limited by the construction disclosed, inasmuch as the end of spring 6 is confined within the box-like structure of the hanger bracket 7 and is permitted only a very limited degree of lateral independent movement. Any undue lateral movement will result in contact between one side of the spring and one set of surfaces 17 on the inside of the bracket arms 15. Thus the hanger is adapted to prevent excessive relative movement in all directions and is adapted positively to check within narrow limits any tendency toward side sway while permitting a very considerable degree of perfectly free pendular movement in the vertical plane in which the spring 6 is located.

The bracket disclosed is preferably reenforced by the provision of the cross webs 24 which connect the arms 15 upon its opposite sides. Each hanger bracket is also preferably connected to the bracket immediately across the frame therefrom by means of a rod 25 attached to an ear 26 which depends from bearing portion 20 of each bracket. The tie rod 25 may be omitted if desired but the ear 26 constitutes convenient means for the application of a tie rod and the tie rod materially strengthens the spring suspension means and reenforces the frame generally. The provision of four of the arms 15 obviously makes a very strong bracket and one which is adapted for use at either end of any given spring, although in any given bracket, the two arms which embrace the end of the spring perform in themselves the dual functions of pendular support and limitation of side sway. The two arms which do not embrace the spring are merely brace members, but if the bracket should be applied to the other end of the spring, the functions of the respective pairs of arms would be reversed.

I claim:—

1. A hanger bracket comprising a bearing, a set of depending arms inwardly converging to said bearing, and links pivotally connected exteriorly to the ends of said bearing and extending upwardly therefrom to a position in which they are adapted to engage a spring confined between said arms.

2. A spring suspension comprising the combination with a bearing element of a bracket member providing a pair of laterally spaced depending arms converging toward the bearing element, a spring having its end extended between said arms and thereby confined against material lateral movement, and links pivotally connecting the end of said spring with said bearing element, whereby said bearing element and arms are given pendular support from the end of said spring.

3. A spring suspension comprising the combination with a bearing element of a bracket member providing a pair of laterally spaced depending arms converging toward said bearing element, a spring having its end extended between said arms and thereby confined against material lateral movement, and links pivotally connecting the end of said spring with said bearing element, whereby said bearing element and arms are given pendular support from the end of said spring, said arms being inclined in a direction having a forward and rearward component from said bearing element and being disposed substantially in the plane of said links, whereby to limit the pendular movement of said links.

4. A spring suspension comprising the combination of a bracket member providing a pair of laterally spaced depending arms converging toward a bearing element, a spring having its end extended between said arms and thereby confined against material lateral movement, and links pivotally connecting the end of said spring with said bearing element, whereby said bearing element and arms are given pendular support from the end of said spring, said arms being provided with portions constituting stops disposed in the path of pendular movement of said links and adapted to limit such movement.

5. A spring hanger bracket comprising an angled portion adapted to be fitted to the side of a vehicle frame member, four mutually spaced arms depending from said angled portion and converging downwardly, a central link-spacing member to which said arms are directly secured, and links pivoted at the ends of said member.

6. A spring hanger bracket comprising an angled portion adapted to be fitted to the side of a vehicle frame member and four mutually spaced arms depending from said angled portion and converging to a lower bearing element, together with a pair of links externally pivoted to the ends of said bearing element and adapted above said element for connection with a spring.

7. A hanger bracket comprising a pair of flanges angularly related and adapted to provide a seat for a frame member, pairs of arms depending from said flanges at the ends of said bracket, the arms of each pair being mutually spaced in a lateral direction, and a bearing element disposed beneath an intermediate portion of said flanges and connected with said several arms, said bearing element having a transverse length no greater than the corresponding dimension of the space between portions of said arms thereabove.

8. A spring hanger comprising a vertically spaced frame seat and bearing element, laterally spaced arms connecting said frame seat and bearing element and having portions spaced apart for a distance approximately equal to the transverse length of said bearing element, and a set of substantially parallel links pivotally bearing on the ends of said element at their lower ends whereby their upper ends have a spacing approximately corresponding to that of said portions.

9. The combination with a longitudinally extending spring seat and a transversely extending bearing element, of a pair of arms connecting said spring seat and bearing element, said arms being laterally spaced at one point for a distance as great as the transverse length of said bearing element and being inclined from said seat to said bearing element in a direction having a longitudinal component.

10. The combination with a longitudinally extending spring seat and a transversely extending bearing element, of a pair of arms connecting said spring seat and bearing element, said arms being laterally spaced at one point for a distance as great as the transverse length of said bearing element and being inclined from said seat to said bearing element in a direction having a longitudinal component, together with a set of links pivotally connected to the ends of said bearing element and adapted to extend vertically upwardly therefrom in a position for connection with the end of a spring receivable between said arms.

11. In a device of the character described, the combination with a frame and hangers fastened to the opposite sides thereof and each comprising a frame seat, laterally spaced depending arms, a hanger bearing and upwardly extending links pivoted to said bearing, of ears depending from said bearing, a tie rod connecting said ears, and a spring upon each side of said frame being confined between said laterally spaced arms in pivotal connection with said links above said tie rod.

12. A hanger bracket comprising angularly related flanges constituting a frame seat, depending arms laterally spaced in sets at each end of said frame seat and downwardly converging, a bearing element connected with said arms below an intermediate portion of said spring seat, said arms converging laterally as well as longitudinally to said bearing member and the spacing of the upper portions of said arms being as great as the transverse length of said bearing member, a bolt extending through said bearing member transversely of said spring seat, links abutting the ends of said bearing member and pivoted on said bolt, and a spring bolt connecting said links between said arms and of a length to receive with a close fit a spring receivable between the arms of either set.

TRAUGOTT J. GUTT.